United States Patent
Lee et al.

(10) Patent No.: US 8,665,402 B2
(45) Date of Patent: Mar. 4, 2014

(54) LIQUID CRYSTAL PANEL

(75) Inventors: Sz-Cheng Lee, Taoyuan County (TW); Chin-Hai Huang, Taoyuan County (TW)

(73) Assignee: Chunghwa Picture Tubes, Ltd., Padeh, Taoyuan (TW)

(*) Notice: Subject to any disclaimer, the term of this patent is extended or adjusted under 35 U.S.C. 154(b) by 172 days.

(21) Appl. No.: 13/277,718

(22) Filed: Oct. 20, 2011

(65) Prior Publication Data
US 2012/0249938 A1 Oct. 4, 2012

(30) Foreign Application Priority Data
Apr. 1, 2011 (TW) ............................. 100205859 U

(51) Int. Cl.
*G02F 1/1335* (2006.01)

(52) U.S. Cl.
USPC ......................................................... 349/113

(58) Field of Classification Search
None
See application file for complete search history.

(56) References Cited

U.S. PATENT DOCUMENTS

| 7,248,317 B2 | 7/2007 | Yang et al. |
| 2006/0055851 A1* | 3/2006 | Sakamoto et al. ............ 349/113 |

FOREIGN PATENT DOCUMENTS

TW          I285860          8/2007

* cited by examiner

*Primary Examiner* — Lucy Chien
(74) *Attorney, Agent, or Firm* — Muncy, Geissler, Olds & Lowe, P.C.

(57) ABSTRACT

A Liquid Crystal (LC) panel includes a substrate and a plurality of metal layers. The substrate has a reflective area, and the metal layers are formed on the substrate. A first reflective metal layer is formed on a surface of the metal layers within a reflective area, and is processed by a mask procedure to form a plurality of first reflective bumps. A second reflective metal layer is formed on the first reflective bumps, and is processed by a mask procedure to form a plurality of second reflective bumps located between the first reflective bumps. The second reflective bumps are higher than the first reflective bumps, so as to form a reflective metal layer having an uneven surface with vertical mismatch.

10 Claims, 6 Drawing Sheets

LIQUID CRYSTAL PANEL

CROSS-REFERENCE TO RELATED APPLICATION

This application claims the benefit of Taiwan Patent Application No. 100205859 filed on Apr. 1, 2011, which is hereby incorporated by reference for all purposes as if fully set forth herein.

BACKGROUND OF THE INVENTION

1. Field of the Invention

The present invention relates to a Liquid Crystal (LC) panel, and more particularly to an LC panel having a reflective surface with vertical mismatch.

2. Related Art

In the prior art, an LC panel has a substrate, on which a plurality of metal layers is configured. After each of the metal layers is deposited on the substrate, a Thin Film Transistor (TFT) circuit pattern is formed by mask operation, gate electrodes, pixel electrodes, and source/drain electrodes are manufactured, and a reflective area is separated on the substrate. A bottom metal layer forms a bump by the mask. A top layer of the reflective area further forms a reflective metal layer. Through the raised design of the bump, the control of a mask irradiation direction and position, and the application of an etch rate of the metal layer, a surface of the reflective metal layer turns into an uneven surface with vertical mismatch and having a specific taper angle of light reflection. Manufacturers often cover the bump with an insulation layer (also called a protective layer), and subsequent metal layers are then deposited, so as to prevent the bump from being affected by other procedures to deform.

However, the thickness of the protective layer (the insulation layer) is difficult to control, and the surface formed after the protective layer (the insulation layer) is covered on the bump usually does not match the shape of the surface of the bump, so that the surface of the subsequently deposited metal layer deforms gradually, and a taper angle of reflection becomes increasingly smooth until disappears, or becomes too steep, thereby making it difficult to form a surface of a reflective metal layer demanded by design personnel.

Therefore, how to manufacture an LC panel having a taper angle of light reflection demanded by design personnel without significantly changing equipment and procedures of a TFT array engineering process of the LC panel is a problem to be solved at present.

SUMMARY OF THE INVENTION

The present invention is directed to an LC panel, in which the shape of a surface of a reflective metal layer is changed, so that the surface of the reflective metal layer has a specific taper angle of reflection.

The present invention is characterized in that, a reflective surface having a specific taper angle of reflection is formed by reflective bumps of two heights. An angle of the reflective surface is controlled by the film thickness and an etch rate of each reflective metal layer, and an irradiation manner and angle of a mask, and is not affected by configurations of a protective film, which facilitates the design and manufacturing of an LC panel with a demanded taper angle of reflection for design personnel. In addition, the configuration of the reflective metal layer is performed after a conventional mask, so that the manufacturing process of the LC panel does not need to be changed significantly, thereby decreasing the renewal cost of equipment. Thirdly, an LC panel having a taper angle of reflection with apparent vertical mismatch can actually be manufactured according to the techniques of the present invention, and an uneven surface of specific mismatch formed in a reflective area of the LC panel can be designed by adjusting at least one of the film deposition thickness, the etching time, and the metal material of the reflective metal layer, to make the LC panel have a specific taper angle of reflection.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described below in detail with reference to the accompanying drawings.

Figure 1A:
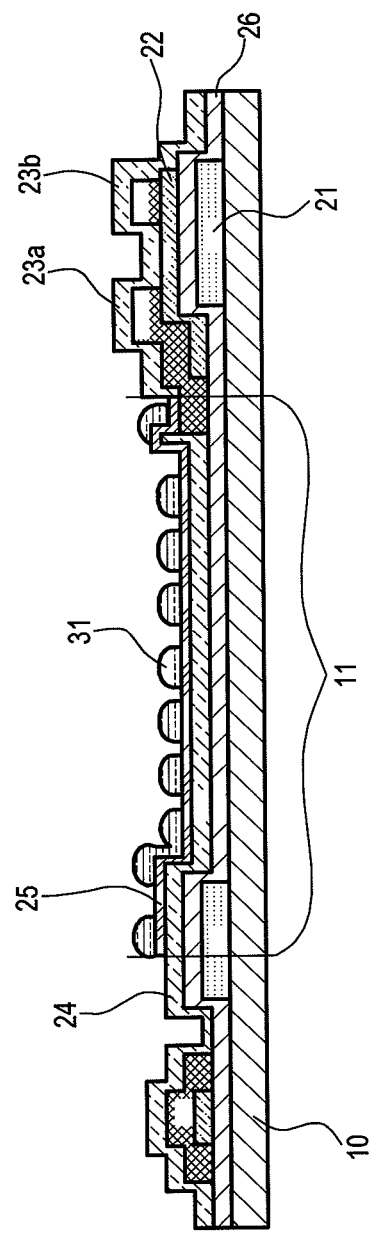
FIG. 1A to FIG. 1B are schematic views of forming a reflective metal layer according to a first embodiment of an LC panel of the present invention.
Figure 1B:
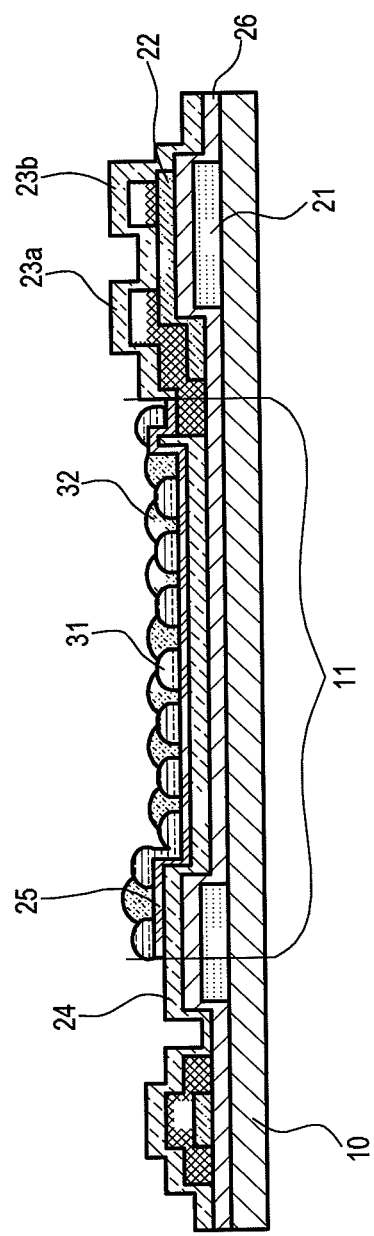

Referring to FIG. 1A to FIG. 1B, FIG. 1A to FIG. 1B are schematic views of forming a reflective metal layer according to a first embodiment of an LC panel of the present invention. The LC panel is described below by using a TFT LC panel as an example.

The LC panel includes a substrate 10 having a reflective area 11. A plurality of metal layers is formed on the substrate 10 by using a TFT array engineering process. The TFT array engineering process forms a TFT circuit pattern arranged in a matrix on the substrate 10, so as to transmit an electronic signal to drive action of LC molecules, thereby achieving variation of a light transmission rate. The array circuit manufacturing process requires five masks: a first layer of mask (a gate electrode mask; GE) to form a gate electrode layer 21; a second layer of mask (an island-shaped semiconductor mask; SE) to form an island-shaped semiconductor electrode layer 22; a third layer of mask (a source/drain electrode mask; SD) to form a source electrode layer 23a and a drain electrode layer 23b; a fourth layer of mask (a contact hole mask; CH) to form a contact hole layer 24; and a fifth layer of mask (a pixel electrode mask; PE) to form a pixel electrode layer 25. After the gate electrode layer 21 is formed, a protective film 26 is covered on the gate electrode layer 21.

A first reflective metal layer is formed on the top of the metal layer by film deposition or sputtering, and is located within the reflective area 11. Then, the first reflective metal layer is processed by a mask procedure, including cleaning, exposing, developing, etching, and film stripping, to form a plurality of first reflective bumps 31, as shown in FIG. 1A.

A second reflective metal layer is formed on the upper end of the metal layer, and covers the first reflective bumps 31 by film deposition or sputtering. The second reflective metal layer is processed by a mask procedure to form a plurality of second reflective bumps 32. The second reflective bumps 32 are not at the same height as the first reflective bumps 31, and are configured between the first reflective bumps 31, as shown in FIG. 1B. In this embodiment, the second reflective bumps 32 are higher than the first reflective bumps 31, but the present invention is not limited thereto.

Each of the second reflective bumps 32 is closely joined to the surrounding first reflective bumps 31, so as to form a reflective metal layer with an uneven surface. Two adjacent reflective bumps have different mismatch, so as to form a relatively smooth taper angle of light reflection, and increase a reflecting area of the LC panel, thereby improving the reflectivity. For example, a taper angle of light reflection formed by two adjacent reflective bumps ranges from 5° to 30°. The first reflective metal layer and the second reflective metal layer are made of aluminum, silver, or aluminum neodymium alloy. A surface of each of the reflective bumps may have the shape of an arc sphere, a straight cylinder, or a coned cylinder. In addition, the film thickness of the first reflective metal layer is different from that of the second reflective metal layer. Even the first reflective metal layer and the second reflective metal layer may be made of different materials to obtain different metal etch rates, which facilitates the adjustment of mismatch formed by the reflective bumps.

In addition, when the exposing operation is performed on the first reflective metal layer and the second reflective metal layer, two masks or a mask shift exposure method may be adopted.

Figure 2:
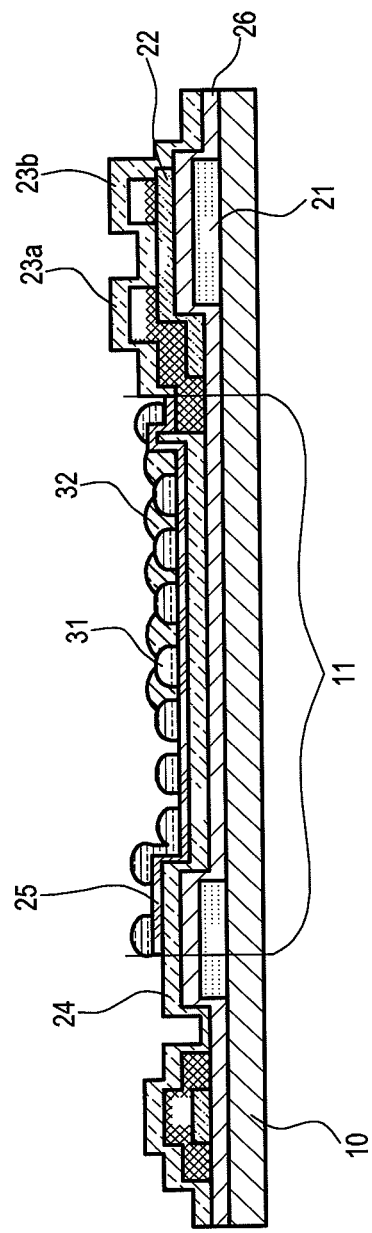
FIG. 2 is a schematic view of forming a reflective metal layer according to a second embodiment of an LC panel of the present invention.

FIG. 2 is a schematic view of forming a reflective metal layer according to a second embodiment of an LC panel of the present invention. A difference from the aforementioned embodiment lies in that, although the second reflective metal layer is formed on the metal layer, the second reflective metal layer only covers a part of the first reflective bumps 31 (in a certain area). After the second reflective metal layer is processed by the mask procedure, the formed second reflective bumps 32 are located between a part of the first reflective bumps 31.

Figure 3:
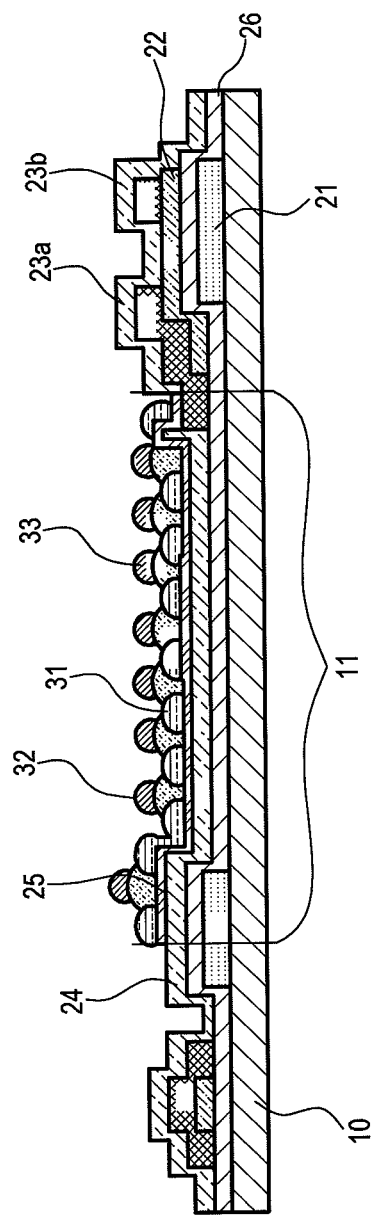
FIG. 3 is a schematic view of forming a reflective metal layer according to a third embodiment of an LC panel of the present invention.

FIG. 3 is a schematic view of forming a reflective metal layer according to a third embodiment of an LC panel of the present invention, which is based on the first embodiment. In this embodiment, a third reflective metal layer is formed on the upper end of the metal layer, and meanwhile covers the first reflective bumps 31 and the second reflective bumps 32 by film deposition or sputtering. The third reflective metal layer is processed by a mask procedure to form a plurality of third reflective bumps 33. The third reflective bumps 33 are formed on the second reflective bumps 32, and the reflective bumps form different mismatch, but a taper angle of light reflection formed by two adjacent reflective bumps also ranges from 5° to 30°. In addition, the first reflective bumps 31, the second reflective bumps 32, and the third reflective bumps 33 form a reflective metal layer having an uneven surface with a plurality of layer heights and different mismatch, and a relatively smooth taper angle of light reflection is formed on the surface to increase a reflecting area of the LC panel, thereby improving the reflectivity.

Figure 4:
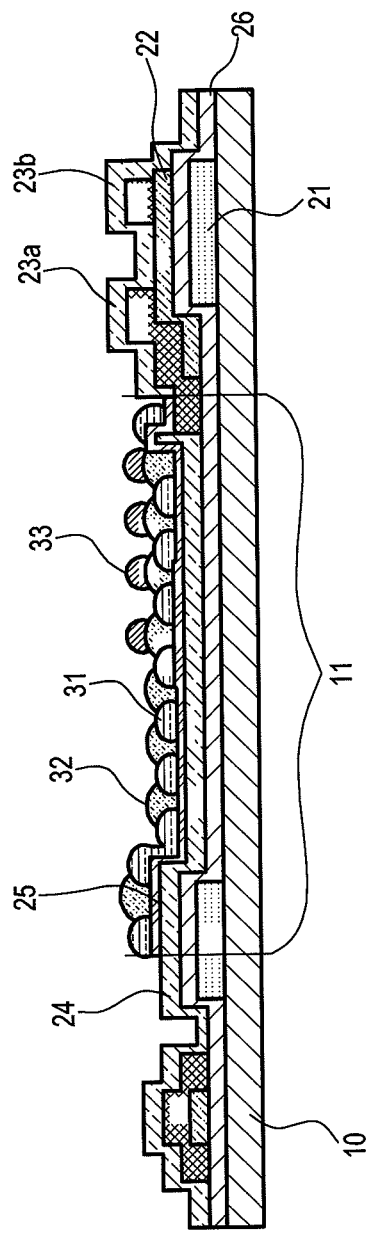
FIG. 4 is a schematic view of forming a reflective metal layer according to a fourth embodiment of an LC panel of the present invention.

FIG. 4 is a schematic view of forming a reflective metal layer according to a fourth embodiment of an LC panel of the present invention. A difference from the aforementioned embodiments lies in that, although the third reflective metal layer is formed on the metal layer, the third reflective metal layer only covers a part of the first reflective bumps 31 and the second reflective bumps 32 (in a certain area). After the third reflective metal layer is processed by the mask procedure, the formed third reflective bumps 33 are located on a part of the second reflective bumps 32.

In addition, when the exposing operation is performed on the reflective metal layers, multiple masks or a mask shift exposure method may be adopted.

Figure 5B:
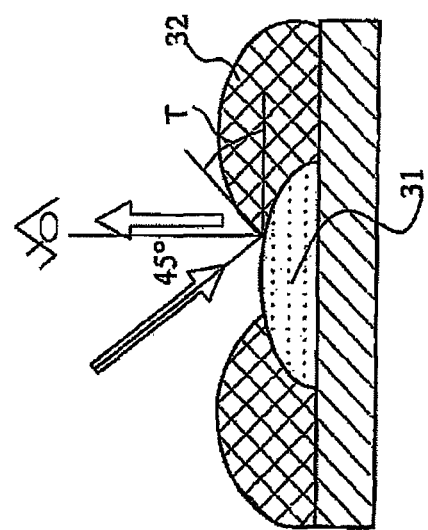
FIG. 5A and FIG. 5B are schematic views of light reflection of an LC panel according to the present invention.
Figure 5A:
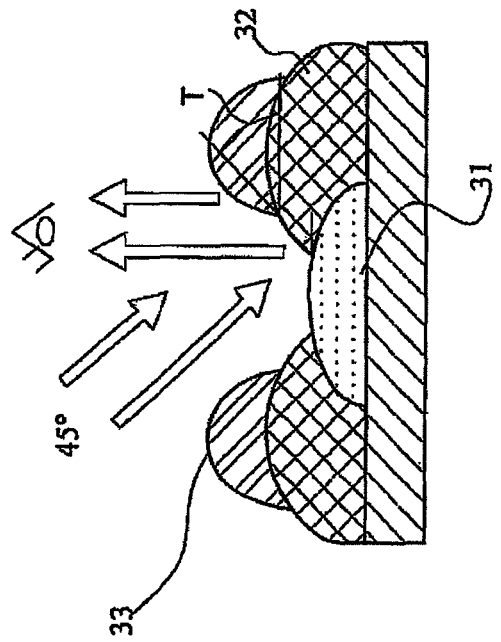

FIG. 5A and FIG. 5B are schematic views of light reflection of an LC panel according to the present invention. The first reflective bump 31 and the second reflective bump 32 are adjacent to each other and form a taper angle of light reflection T ranging from 5° to 30°. Furthermore, the second reflective bump 32 and the third reflective bump 33 are adjacent to each other and also form a taper angle of light reflection T ranging from 5° to 30°. When an angle of incidence of a light source is within 45°, light beams are reflected perpendicular to a panel and into the sight of a user.

In view of the above, the implementation or embodiments of the technical solutions presented by the present invention to solve the problems are described herein, which is not intended to limit the scope of the present invention. Equivalent modifications and variations made in accordance with the claims of the present invention or based on the claims of the present invention shall fall within the protection scope of the present invention.

What is claimed is:

1. A Liquid Crystal (LC) panel, comprising:
   a substrate, having a reflective area;
   a plurality of metal layers, formed on the substrate;
   a first reflective metal layer, formed on a surface of the metal layers within the reflective area, and processed by a mask procedure to form a plurality of first reflective bumps; and
   a second reflective metal layer, formed on the first reflective humps, and processed by a mask procedure to form a plurality of second reflective bumps, wherein the second reflective bumps are higher than the first reflective bumps, and are configured between the first reflective bumps, and a part of each of said plurality of first reflective bumps is exposed out from the second reflective bumps.

2. The LC panel according to claim 1, wherein each of the second reflective bumps joins the surrounding first reflective bumps closely to form a reflective metal layer with an uneven surface.

3. The LC panel according to claim 1, wherein the second reflective bumps are configured between a part of the first reflective bumps.

4. The LC panel according to claim 1, wherein surfaces of the first reflective bumps and the second reflective bumps are in the shape of an arc sphere, a straight cylinder, or a coned cylinder.

5. The LC panel according to claim 1, wherein the film thickness of the first reflective metal layer is different from that of the second reflective metal layer.

6. The LC panel according to claim 1, wherein a metal etch rate of the first reflective metal layer is different from that of the second reflective metal layer.

7. The LC panel according to claim 1, wherein the first reflective metal layer and the second reflective metal layer are made of aluminum, silver, or aluminum neodymium alloy.

8. The LC panel according to claim 1, further comprising a third reflective metal layer, formed on the first reflective bumps and the second reflective bumps, and processed by a mask procedure to form a plurality of third reflective bumps, wherein the third reflective bumps are formed on the second reflective bumps.

9. The LC panel according to claim 8, wherein the third reflective bumps are configured on a part of the second reflective bumps.

10. The LC panel according to claim 8, wherein the first reflective bumps, the second reflective bumps, and the third reflective bumps form a reflective metal layer having an uneven surface with a plurality of height levels.

* * * * *